Aug. 26, 1952 — J. W. WHITE — 2,608,063
HYDRAULIC MASTER CYLINDER
Filed March 1, 1951 — 3 Sheets-Sheet 3

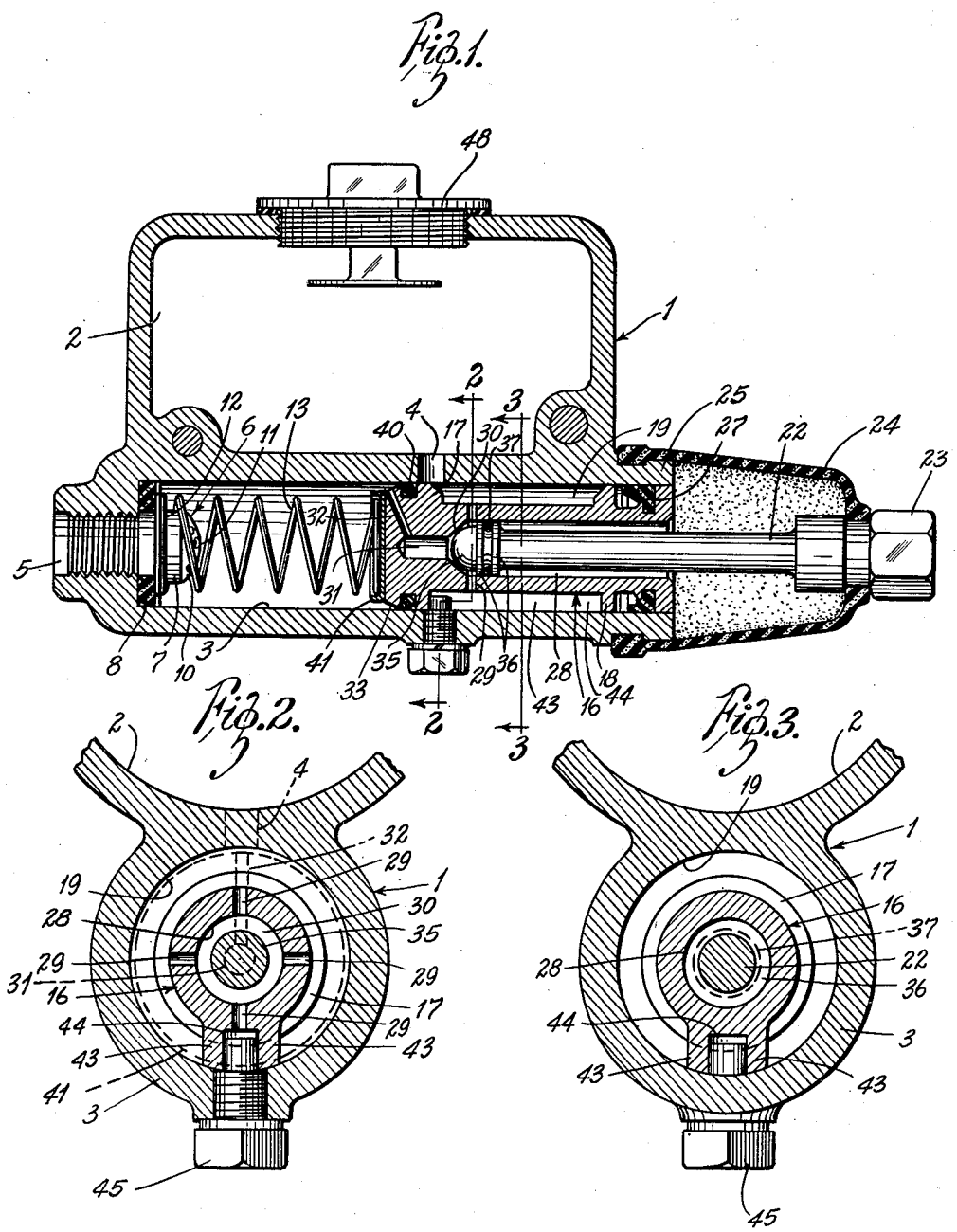

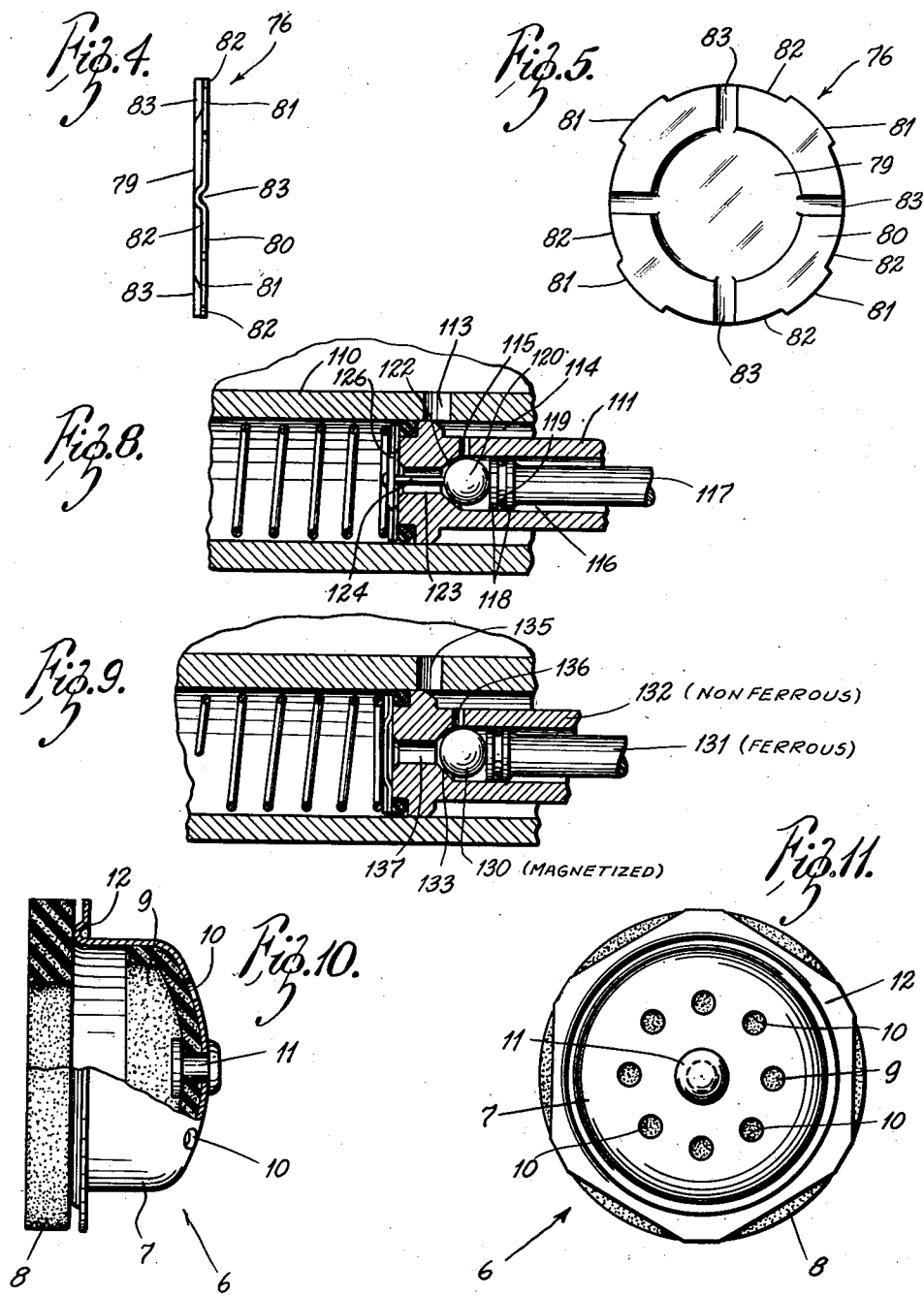

INVENTOR:
JOHN W. WHITE,
BY Kingsland, Rogers & Ezell
ATTORNEYS

Patented Aug. 26, 1952

UNITED STATES PATENT OFFICE 2,608,063

HYDRAULIC MASTER CYLINDER

John William White, North Hollywood, Calif.

Application March 1, 1951, Serial No. 213,377

17 Claims. (Cl. 60—54.6)

The present invention relates to a hydraulic master cylinder. The invention is particularly concerned with master cylinders of the type used for automobile brakes, but it will be understood that it is capable of other uses.

Master cylinders of this kind, as heretofore generally used, consist of a reservoir for hydraulic fluid below which is disposed a horizontal master cylinder in which a compression piston is located. The compression piston is suitably associated with the brake pedal so that, when it is displaced, hydraulic fluid is put under pressure in the cylinder. Working lines lead from the cylinder to the wheel brake cylinders to actuate the brakes.

A well known problem in connection with hydraulic master cylinders is the requirement that the operating end of the cylinder and the associated parts of the system be always supplied with and kept full of the hydraulic liquid. As a result of this requirement, a problem has always existed of expansion and contraction of the fluid in the system, such as might occur with temperature changes, and which must not be permitted to actuate the brakes. Heretofore, the conventional means for overcoming this problem has been to introduce a relatively small bleeder or compensating port between the reservoir and the master cylinder, ahead of the piston, when the latter is in its retracted position. This port has been a source of considerable trouble because it is subject to becoming clogged. Also, because of the sharp edges across which the familiar cup packing at the front face of the piston must pass with each stroke of the piston, the cup seal is subjected to wear and ultimately to destruction as an effective seal. To minimize such wear on the cup, the compensating port must be so small in diameter, approximately .030 ($\frac{1}{32}$), as to require extreme care in drilling, and it is responsible for lost motion of the piston on its forward movement until the cup packing passes the port.

Furthermore, in master cylinders for trucks, the pressure used in applying the wheel brakes is as a rule much higher than that employed in setting the wheel brakes in passenger automobiles. Such pressure for the latter rarely is more than eight hundred pounds whereas in trucks, military trucks for example, such pressure may be as high as eighteen hundred pounds. With such high pressures, the free lip of the cup packing, which must cross the sharp edges of the compensating port, will become grooved by scuffing and the material of the cup packing thus freed often lodges in the compensating port and ultimately blocks the same, thus stopping the proper operation of the port.

By the elimination of the compensating port, I have succeeded in doing away with all troubles due to scuffing of the cup packings on the sharp edges of such port, or any other type of packing that may be used.

It also has been heretofore proposed that the piston have a port through its head, with a valve that is forced by a pressure stroke of the piston to engage the port and close it whenever the piston is operated, following which closure the valve acts as a medium to transmit the pedal force to the piston to move it. When the pedal is released, the valve immediately may open to provide relatively free communication through the piston. Usually in such systems, the piston operates vertically, but, even where they have been shown in connection with horizontally operating pistons, they have involved complicated mechanisms and have not proved capable of supplanting the conventional master cylinder despite the objections aforesaid due to the bleeder port. One of the deficiencies of such arrangements has been their inability to purge air from the hydraulic system.

The present invention, therefore, comprises a horizontally disposed master cylinder located below the fluid reservoir and entirely comparable to the present conventional master cylinders in general shape and size; but which eliminates the necessity of the compensating or bleeder port ahead of the piston. The present invention likewise accomplishes the object of eliminating the possibility of clogging of the communicating ports and passages between the reservoir and the operating cylinder. My invention also accomplishes the object of reducing lost motion to a minimum.

One of the particular objects of the invention is to improve the scavenging of the operating cylinder of any vapor or air without the use of the compensating port. A further specific object of the invention is to keep the operating face of the piston clear, both for operational advantages, and also to improve the machining requirements.

A further object is to improve the sealing of the piston, both with respect to its forward face and with respect to its seal with the valve element.

A further object of the invention is to improve the mounting and construction of the return spring for the piston.

Another object of the invention is to insure the complete filling of the cylinder ahead of the piston when the latter is in its retarded position, by means of a single passageway leading through the piston from the fluid reservoir so that brake fluid may flow freely from such fluid reservoir through the piston to insure the complete filling of the cylinder ahead of the piston when the latter is in retracted position, and the free flow of air and fluid through said piston in the opposite direction whenever necessary and the piston is in retarded position.

Other objects will appear from the description to follow.

In the drawings:

Figure 1 is a vertical medial section through the master cylinder and associated parts;

Figure 2 is a transverse section taken on the line 2—2 of Figure 1;

Figure 3 is another transverse section taken on the line 3—3 of Figure 1;

Figure 4 is an edge view of a washer used at the piston face;

Figure 5 is a face view of the washer;

Figure 8 is a fragmentary vertical longitudinal section through a further modified form of master cylinder assembly;

Figure 9 is a fragmentary vertical longitudinal section through a further modified form of master cylinder assembly;

Figure 10 is an enlarged view partly in section and partly in elevation of a double flow check valve; and Figure 11 is a front elevation of the same.

Embodiment of Figures 1-3

Figure 6:
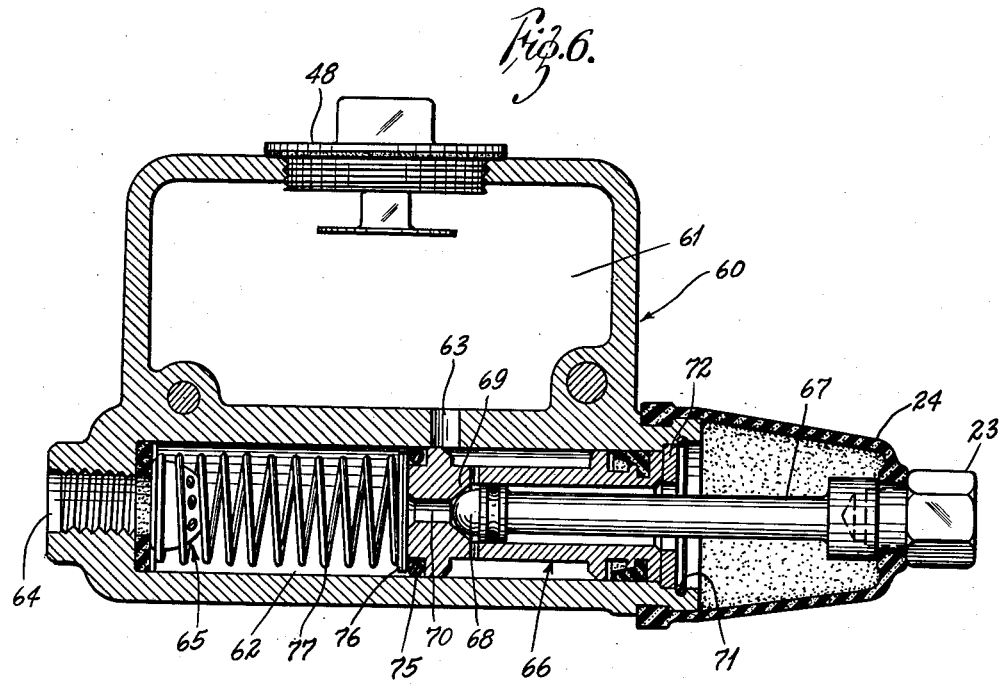
Figure 6 is a vertical longitudinal section through a modified form of master cylinder assembly.

Referring first to Figures 1-3, there is a unitary and usually cast member 1 having a fluid reservoir 2 at its upper end, and a horizontal cylinder 3 disposed below the reservoir. The cylinder 3 extends substantially from end to end of the member 1. A fluid port 4 connects the reservoir with the cylinder 3. An outlet 5 leads from one end of the cylinder 3 for connection with the actuated devices such as wheel cylinders, and it is shown as controlled by the conventional backflow check valve 6. This valve has three parts: a flanged cup stamping 7, a resilient seat washer 8; and an inside flexible cup 9.

The stamping 7 has perforations 10 through its end that are controlled by the flexible cup 9. The cup 9 may be attached to the metal cup 7 by a rivet 11. The metal cup 7 has a ribbed flange 12 that can seal against the flexible washer 8, and it is urged against the washer 8 by a spring 13, that also acts as a piston return spring as will later appear. The flexible cup 9 permits fluid to flow through the ports 10 in the central portion on the outward flow (to the left in Figure 1) but checks such flow on return. The return flow is caused by the retraction of the brake springs returning the wheel cylinders to normal. This return flow is of sufficient pressure to raise the cup-like stamping 7 off the resilient seat 8 against the aforementioned spring pressure, whereupon fluid may pass between the flange 12 of the cup 7 and the resilient seat 8.

Within the cylinder 3, there is a piston generally indicated at 16. Preferably, it is of the spool type, having heads 17 and 18 between which there is a circular, peripheral space that, with the cylinder, provides for a generally cylindrical passage space 19.

The piston 16 is adapted to be actuated by a pitman or thrust rod 22 that has familiar connecting and adjusting means 23 by means of which it may be connected to or actuated by a conventional brake pedal or the like. A flexible boot 24 is mounted at one of its ends about the thrust rod 22; and at its other end around a suitable boss 25 on the end of the cylinder portion of the casting 1.

The head 18 of the piston may be provided with a packing member 27 to prevent escape of liquid into the boot 24.

The pitman 22 extends into a socket 28 in the piston 16. Adjacent the inner end of the socket 28, at least one lateral passage 29 leads through the piston wall to establish communication with the peripheral space 19 around the piston. The inner end of the socket terminates in a valve seat 30 that is at the end of a port 31 in the piston. The forward end of the passage 31 has an angular extension passage 32 leading up to the top of the front part of the head 17 of the piston, which front portion is slightly tapered as shown at 33.

The forward end of the thrust rod or pitman 22 has a hemispherical head 35 to provide a self-seating valve cooperable with the valve seat 30 to check any flow of fluid therethrough, when this valve head 35 is seated.

Two flanges 36 are disposed around the pitman 22 just behind the valve head 35. These flanges provide a groove for an O-ring packing 37 that seals against escape of fluid back of the head of the pitman 22 and into the boot 24. The flanges 36 are preferably of slightly less diameter than the socket 28 to permit some rocking movement of the pitman 22 by its connection with a rocking type of brake pedal lever.

The forward head 17 of the piston is grooved to provide a seat for an O-ring packing 40. The groove lies back of the tapered portion 33.

The forward face of the piston 16 is shaped to receive a metal washer 41. This washer receives the back end of the return spring 13. The forward end of the return spring can snap onto the double check valve 6, to provide the spring action therefor, as previously mentioned.

To maintain the piston against rotation in the cylinder, there are two longitudinal flanges 43 (Figures 2-3) at the lower side of the piston 16. The flanges provide a groove 44 that receives the end of an abutment screw 45. This screw limits the return movement of the piston, and also is used to eliminate the conventional snap ring and stop washer.

The reservoir is provided with a suitable removable plug 48 for replenishment of the fluid. The plug has a small passage (not shown) for the escape of air.

Operation of Figures 1-3

The system will be assumed to be charged with fluid, and suitably scavenged of air. The parts are all assembled so that they occupy the relative positions illustrated in Figure 1 with the brake pedal released. In this position, the pitman 22 is slightly withdrawn so that the valve head 35 slightly clears by about $\frac{1}{32}$" and hence does not close the valve seat 30.

It will be seen that, with a supply of brake fluid in the reservoir 2, such fluid may flow through the port 4, and at all times may enter the space 19. From this space, it may at all times flow through the lateral ports 29 to surround the head 35. When the valve 35 is released, the liquid likewise may flow past the open valve seat 30 through the port 31—32 so as to maintain a full supply of fluid in the operating portion of the cylinder 3.

When the brake pedal is depressed, the pitman 22 is thrust to the left in Figure 1. This initially and almost immediately causes a closure of the head 35 against the valve seat 30, thereby closing all communication between the forward and back faces of the head 17 of the piston 16. In such action, the O-ring 37 on the pitman 22 and the packing 27 maintain seals to check leakage of the fluid back of the piston and into the boot 24.

Additional forward movement of the pitman 22 after closure of the valve 35 causes the piston 16 to move to the left in Figure 1, compressing the spring 13 and forcing the operating hydraulic fluid past the double check valve 6 and into the outlet 5, whence it is forced to the wheel brake cylinders or whatever is being operated by the master piston. During all such forward movement, the brake pedal pressure acting through the pitman 22 maintains the valve 35 firmly closed on the seat 30. This valve being hemispherical is self-aligning.

When the pedal is released, the normal return spring thereon (not shown) relatively quickly withdraws the pitman 22. The spring 13 and the return forces from the wheels force the piston 16 backward. Immediately upon release of the pressure on the foot pedal, the valve 35 may be reopened, and it is always reopened when the pitman 22 returns to its rest or starting position.

In the return flow, the hydraulic fluid surges back and flows out through the angular passage 32 through the piston. Any air in the system moves with the fluid. If the air be at the high point of the cylinder 3, it is carried back through the passage 32.

Since the valve 35 is open in the rest position, there is always a ready passage of fluid from the reservoir to the operating parts in the cylinder. This replenishment can always occur as required during a retraction stroke of the piston.

Embodiment of Figures 4–6

The master cylinder assembly of Figure 6 is designed to simplify the piston construction, and to permit the use of the standard snap ring stop means for the return stroke of the piston. It also eliminates the necessity for preventing rotation of the piston around its own axis.

In this type, the over-all cylinder casting is indicated at 60, it having the same reservoir 61 and having the same operating cylinder 62 corresponding with the similar parts in the previous type. There is a port 63 connecting the reservoir and the cylinder, and an outlet 64 to the working line that is controlled by a double flow check valve 65. The piston is shown at 66.

The piston is actuated by a pitman 67 in the same manner as in the previous modification. The pitman has a valve head 68 that cooperates with a valve seat 69 formed at the end of an axial passage 70 that may be flared at its forward end to open into the cylinder through the center of the piston face.

In this case, a conventional snap ring 71 with a washer 72 may be provided to limit the back stroke of the piston 66.

The front face of the piston is shouldered to receive an O-ring 75 that seals on the forward stroke of the piston. A disc 76 is located at the front face of the piston 66. The disc 76 is shown separately in Figures 4 and 5. A return spring 77 is located between this disc 76 and the double check valve 65.

The disc 76 has a forwardly offset central portion 79 within a circular periphery 80. The edge of the disc 76 has arcuate projections 81, and the maximum diameter formed by these arcuate projections 81 is such as to give a sliding fit in the cylinder 62. There are arcuate reliefs 82 in the edge between the projections 81 for a purpose to appear. A plurality of radial channels 83 extend from the offset central portion 79 to the edges within the reliefs 82. With this arrangement, passages are always open around the disc 76 to the piston passage 70.

The coil spring 77 not only acts as a return spring for the piston in the same manner as the spring 13 acts in the previous embodiment of my invention but it also holds the disc 76 against the O-ring seal 75 to hold the O-ring in place on the return stroke of the piston 66.

Operation of Figure 6

The general operation of the cylinder in Figure 6 is the same as that of Figure 1. In this modification, the disc 76 is located over the outlet of the passage 70, but continuous communication from the passage 70 around the disc 76 is assured by its construction as aforesaid. Any air that collects in the cylinder (usually at the top) is forced with outflowing fluid past the disc to the passage 70 and back to the reservoir. Similarly between this and the previous embodiment, as to the presence of a radial passageway from an axial bore to the outer part of the piston, is apparent.

In this embodiment as in the previous one, the release of the brake pedal after a braking operation may withdraw the pitman from the piston, opening the valve, and affording a relatively free flow of fluid from the front to the back of the piston. This action enables fluid under pressure ahead of the piston to pass through the piston, scavenging air with it.

The embodiment of Figure 6 simplifies machining operations over that of Figure 1. The angular passage 32 is eliminated and its functions taken over by the radial channels in the disc 76, which may be easily die-formed. The O-ring groove is more readily made, the disc 76 forming a holding means therefor. In the mounting of an O-ring as shown in Figure 1, a small amount of side play necessarily results and is required. In the mounting shown in Figure 6, this side play is eliminated, since the disc 76 abuts the piston head flush with the O-ring and the passages 83 allow for the necessary flow of the pressure fluid to the inner quadrant of the pressure side of the ring without side play, thereby reducing lost motion and the possibility of air entrapment in the cylinder due to side play of the O-ring.

It will be observed that this construction, as well as that of Figure 1, permits the use of a constant diameter spring, which fits against the disc 76 and also over the pressure valve 65, thus eliminating the requirement that a tapered spring be used as in the conventional construction having a cup type seal.

Figure 7:
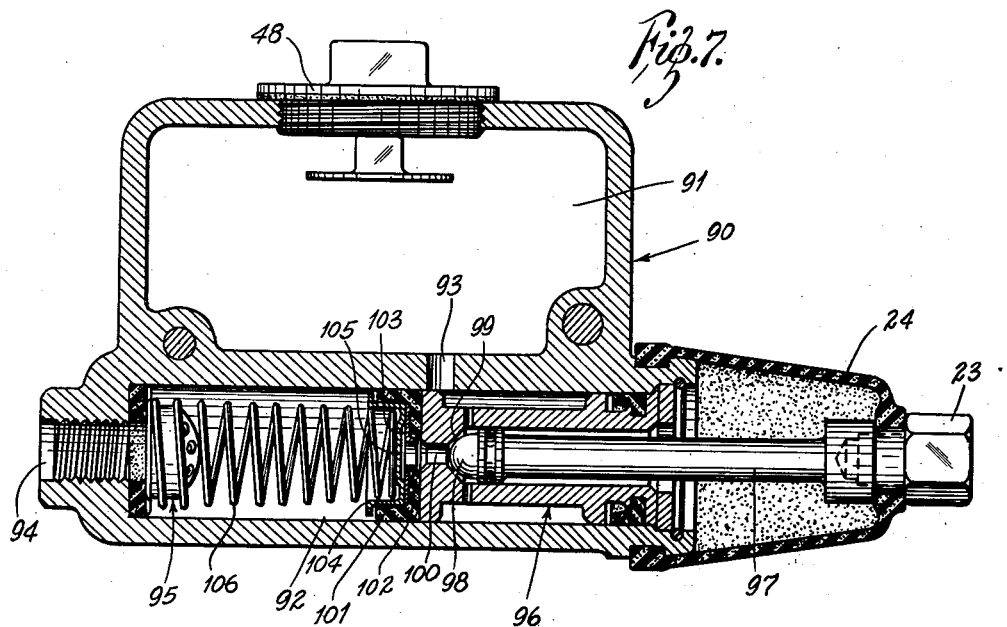
Figure 7 is a vertical longitudinal section through a modified form of master cylinder assembly.

Embodiment of Figure 7

Figure 7 demonstrates an application of the invention to the use of a cup seal in place of an O-ring. In this construction, the over-all casting is indicated at 90 with a reservoir 91, a cylinder 92, and a communicating port 93. The outlet is at 94, and is regulated by a double check valve 95. The piston 96 is operated by a pitman 97 the same as before. The pitman has a valve head 98 that cooperates with a valve seat 99 regulating a passage 100 that is in communication with the forward part of the cylinder 92. These parts are all the same as in the previous modification. However, in this type there is a cup washer type seal 101 of conventional construction. It has, however, a center hole 102 that can register with the passage 100 in the piston. A metal flanged cup 103 fits within the tapered forward recess in the cup seal 101. This washer has a central backwardly extending flange that seats within the opening 102 of the cup and acts as a base for a cup washer 104. The cup washer has the radial offsets 105 that provide channels similar to those in disc 76 of Figures 4 and 5.

In this case, the spring 106 is tapered somewhat to accommodate for the reduced diameter of the cup 103 required by the presence of the cup seal 101.

This type of arrangement employs more of the conventional parts now used in hydraulic master cylinders, but does not get the advantages of the O-ring, nor does it permit the use of a constant diameter spring.

Embodiment of Figure 8

The embodiment illustrated in Figure 8 is similar to but differs from that illustrated in Figure 6 essentially in the use of an ordinary metal ball as the valve head element. Figure 8 shows the cylinder 110 with a piston 111 (only the forward portions being illustrated). The reservoir port 113 communicates as before with a peripheral space 114 around the piston 111, and by the lateral passage 115 to the forward end of the socket 116 in the piston, wherein the pitman 117 fits. The forward end of the pitman 117 may be squared off adjacent the O-ring flanges 118 that hold the O-ring 119, and can bear against a ball valve 120, freely mounted in the socket 116 in the piston between the valve seat and the free end of the pitman 117. Through the axial passageway 123 in the piston extends a rod 124, which, at its rear end, engages the ball 120 and at its forward end extends through the disc 125 to which it may be either riveted or spot welded. The rod 124 is intended to lift the ball 120 off the valve seat 122 when the piston is in retracted position, and should, therefore, be a little longer than the passage 123 through the piston. In this construction, when the pitman 117 moves forward, it immediately pushes the ball 120 into engagement with the valve seat 122, and from that point on the operation of the device is the same as heretofore described. It will be understood that the rod 124 is slightly longer than the passageway 123 to insure that the ball 120 will not remain on the valve seat 122 when the piston is retracted. The separate ball type of valve can tolerate a greater amount of rocking movement of the pitman, while yet obtaining immediate seating of the valve as soon as the pitman is pressed inwardly.

Embodiment of Figure 9

The embodiment illustrated in Figure 9 differs from that illustrated in Figure 8 essentially in the use of a magnetized ball 130, instead of one that is not magnetized as shown in the former figure. In this construction, the pitman 131 is of a ferrous, or magnetizable metal, whereas the piston 132 is of a non-ferrous metal such as an aluminum casting made in a permanent mold, and accordingly the valve seat 133 is non-magnetizable. As a result, when the piston 132 is in its retracted position and the pitman 131 is likewise retracted, the magnetized ball 130 adheres to the free end of the pitman 131 and allows for the free passage of brake fluid from the reservoir through the passageway 135, 136 and 137 to the front head of the piston.

One of the features of my invention inherent in all of the embodiments of it illustrated in the drawings resides in the complete filling of the cylinder with brake fluid upon the return of the piston to its retracted position. In conventional systems, such as shown in Loughead and Loweke, United States Patent No. 1,758,671, dated May 13, 1930, it will be noted that the head of the piston is drilled through with a number of relatively small holes. The rubber cup washer at the front of said piston head normally closes said holes. A star spring, or the like, suitably riveted to the piston head, between it and the rubber washer, is now generally used, the free end of each projection of said spring covering one of the holes through the piston head so as to prevent the rubber of the cup washer from entering the hole and being punctured as a result thereof, when the cup washer is under pressure due to the advance of the piston in the cylinder. This star spring is preferably formed of flexible material and the cup washer is preferably formed with grooves adjacent to the adjoining wall of the piston, thus providing for the flow of brake fluid through the holes in the piston, past the star spring and cup washer into the cylinder in front of the piston. The return spring for the piston, between it and the forward end of the cylinder, forces the piston rearward as soon as the brake pedal is released, and the fluid between the reservoir and the piston head may flow through the holes in the piston head as aforesaid. This flow may be caused essentially by a vacuum formed in the cylinder in front of the piston and before the brake fluid is returned from the wheel cylinder. Consequently, the cylinder in front of the retracted piston will receive more brake fluid than it can hold and such over-fill of brake fluid escapes upward through the compensating port in front of the cup washer on the piston head when the piston is retracted, thereby insuring that the cylinder in front of the piston in the latter's retracted position will always be completely filled.

It is evident that with each of the embodiments of my invention the pitman is immediately retracted upon release of the foot pedal, thereby establishing a continuous single pathway for the free flow of brake fluid from the reservoir through the front piston head. Should there be any tendency for a vacuum to form in the cylinder, during the retraction of the piston, it would be at once relieved by the free end of the pitman moving away from the valve seat and opening the single passage from the fluid reservoir to the cylinder in front of the piston. Furthermore, should the cylinder in front of the piston, after the latter is in its retracted position, be filled with fluid flowing through such single passage, including the valve seat, any additional fluid and air forced back to the cylinder from the wheel cylinders may escape in the opposite direction through said open valve to fluid reservoir. In other words, I provide inherently for the complete filling of the cylinder in front of the piston at the end of each stroke of the piston.

It will be seen that the present inventions require only minimal changes in present equipment and tooling, but obtain distinct advantages over current master cylinders. In general, the larger parts are very similar to those presently used. There are no additional moving pistons or pitmans or the like required to obtain the advantages of the present system. The arrangement of the pitman to seal and yet have angular movement with rocking of the brake lever is both easy to provide and simple to assemble. The use of an O-ring seal simplifies piston construction and reduces lost motion. The difficulties attendant upon use of the conventional bleeder or compensating port are eliminated without affecting proper functioning of the master cylinder.

What is claimed is:

1. In a master cylinder, a cylinder, a spool type piston therein having a socket extending through the rear end thereof, a valve seat formed in said piston at the inner end of the socket, a single port through said cylinder wall communicating at all times with the spool recess in said piston, a port through said piston establishing communication between said spool recess and said valve seat, and means providing a passage for fluid flow from the valve seat to the forward part of the piston adjacent the periphery thereof within said cylinder.

2. In a master cylinder, a cylinder, a spool type piston therein having a socket extending through the rear end thereof, a valve seat formed in said piston at the inner end of the socket, a single port through said cylinder wall communicating at all times with the spool recess in said piston, a port through said piston establishing communication between said spool recess and said valve seat, and a pitman extending into the socket and having a valve head adapted to engage said valve seat.

3. In a master cylinder, a cylinder, a spool type piston therein having a socket extending through the rear end thereof, a valve seat formed in said piston at the inner end of the socket, a single port through said cylinder wall communicating at all times with the spool recess in said piston, a port through said piston establishing communication between said spool recess and said valve seat, a pitman having its free end disposed within said socket and provided with a valve head adapted to engage said valve seat, and means providing a fluid seal between said pitman and the walls of said socket.

4. In a master cylinder: a reservoir, a cylinder horizontally arranged below the reservoir; a reservoir port between the reservoir and cylinder entering the cylinder wall at a point between the ends thereof; a piston slidable in the cylinder, an axial socket from the back end of the piston toward the front end thereof; main passage means providing a passage from the surface of the piston adjacent the periphery of the front of the piston to the inner end of the socket and a valve seat at the entrance of the passage means into the socket, a piston port through the piston wall between the end of the socket back of the valve seat and the lateral surface of the piston, there being a space between the lateral surface of the piston and the cylinder into which said piston port connects, and which extends axially a distance to provide constant passage for liquid from the reservoir port to the socket throughout the stroke of the piston, a pitman and a valve at the forward end of the pitman forced into engagement with the valve seat upon forward movement of the pitman but withdrawable from the valve seat upon retraction of the pitman, pitman sealing means between the pitman and the socket walls back of the lateral passage means, piston sealing means between the piston and the cylinder walls, and return spring means acting against the forward face of the piston.

5. In a master cylinder: a reservoir, a cylinder horizontally arranged below the reservoir; a reservoir port between the reservoir and cylinder entering the cylinder wall at a point between the ends thereof; a piston slidable in the cylinder, an axial socket from the back end of the piston toward the front end thereof; passage means from the forward end of the piston to the inner end of the socket and a valve seat at the inner end of the socket; a piston port through the piston wall between the end of the socket back of the valve seat and the lateral surface of the piston, there being a space between the lateral surface of the piston and the cylinder into which said piston port connects, and which extends axially a distance to provide constant passage for liquid from the reservoir port through the piston port to the socket throughout the stroke of the piston, a pitman and a valve at the forward end of the pitman forced into engagement with the valve seat upon forward movement of the pitman but withdrawable from the valve seat upon retraction of the pitman, pitman sealing means between the pitman and the socket walls, back of the lateral passage means, piston sealing means between the piston and the cylinder walls, and return spring means acting against the forward face of the piston, the pitman having freedom to rock in the socket and the valve having a spherical surface to seat regardless of such rocking movement.

6. The combination of claim 5, wherein the pitman sealing means comprises a ring seal with a rounded outer surface, and the pitman has a groove to contain the ring seal, the peripheral walls adjacent the groove being of less diameter than the socket to enable the pitman to rock without breaking the seal.

7. The combination of claim 5, wherein the pitman has ridges around it of less diameter than the socket within the piston, and providing a peripheral groove, and an O-ring seal in the groove.

8. The combination of claim 4, wherein there is a disc at the forward face of the piston and maintained thereagainst by the return spring, the main passage means including an axial passage from the socket through the forward face of the piston, and outwardly extending channel means formed in the disc and terminating adjacent the periphery thereof.

9. The combination of claim 8, wherein the disc has a diameter to bear against the cylinder walls, and its peripheral edge has notches adjacent the peripheral terminations of the outwardly extending channel means.

10. The combination of claim 8, wherein the piston sealing means comprises a groove around the edge of the piston at its forward face, and a ring packing in said groove and axially pressed and retained therein by the disc and return spring.

11. The combination of claim 5, wherein the main passage means includes a plurality of passages in the piston head extending outwardly from forward of the valve seat, and terminating adjacent the periphery of the piston.

12. The combination of claim 11, wherein the forward end of the piston is tapered ahead of the piston sealing means, and the outwardly extending passages open through said tapered part of the piston.

13. In a hydraulic master cylinder, a piston having a passageway therethrough, a valve seat in said piston associated with said passageway, a ball for engagement with said valve seat, a pitman movable independently of the piston, being movable toward the piston for engagement with said ball and, upon further movement, to force the ball against the valve seat, and then to move the piston, yieldable means urging the piston in a direction toward the pitman, and means normally urging the ball to follow movements of the pitman in a direction away from the valve seat when the pitman is withdrawn and the yieldable means urges the piston toward the withdrawing pitman to admit flow around the ball through the passageway, the pitman when forced toward the valve seat, driving the ball into sealing engagement with the seat.

14. In a hydraulic master cylinder, a non ferrous metal piston having a passageway therethrough for the flow of brake fluid, a valve seat in said piston associated with said passageway, a magnetized ball for engagement with said valve seat and a pitman of ferrous metal for engagement with said ball.

15. A master cylinder piston having a socket extending inwardly from one end thereof; a valve seat at the inner end of the socket; and means providing a fluid flow passage from the valve seat to the forward part of the piston adjacent the periphery thereof.

16. A passage providing means for a hydraulic master cylinder, comprising a sheet-like disc having a center recess on one face, offset from the periphery of the disc, and channels extending outwardly from the recess to the edge of the disc, the disc being cut away at the outlets of the channels to dispose said outlets slightly inward from the edge of the disc.

17. In a master cylinder construction, a housing including a cylinder having an outlet at one end thereof and a reservoir entrance communicating into the cylinder at the opposite portion of the cylinder; a piston in the cylinder slidable toward the outlet from a retracted position to an advanced position, stop means to limit retraction of the piston, the piston having a portion extending backward beyond the point of the reservoir entrance into the cylinder, the piston having a socket recess extending from its back end toward its pressure face, with a fluid flow passage from the bottom of the socket through the pressure face; valve means at the bottom of the socket for regulating flow through the passage; the backwardly extending piston portion having a port through the wall thereof and being reduced on its outside surface adjacent the port, the reservoir entrance and the reduced part providing for conduction of liquid from the reservoir entrance into the cylinder at all times during the movement of the piston, and the port through the reduced portion of the piston providing for conduction of liquid into the socket recess adjacent the valve means.

JOHN WILLIAM WHITE.

REFERENCES CITED

The following references are of record in the file of this patent:

UNITED STATES PATENTS

| Number | Name | Date |
|---|---|---|
| 2,060,846 | Bowen | Nov. 17, 1936 |
| 2,136,835 | Begg | Nov. 15, 1938 |
| 2,181,754 | White | Nov. 28, 1939 |
| 2,262,843 | Goepfrich | Nov. 18, 1941 |
| 2,276,009 | Baldwin | Mar. 10, 1942 |
| 2,284,935 | White | June 2, 1942 |
| 2,308,501 | Eksergian | Jan. 19, 1943 |
| 2,404,502 | Kehle | July 23, 1946 |
| 2,405,927 | Tornblum | Aug. 13, 1946 |